Dec. 29, 1970   B. ZIMMERN   3,551,082
GLOBOID-WORM COMPRESSORS
Filed Jan. 27, 1969   8 Sheets-Sheet 2

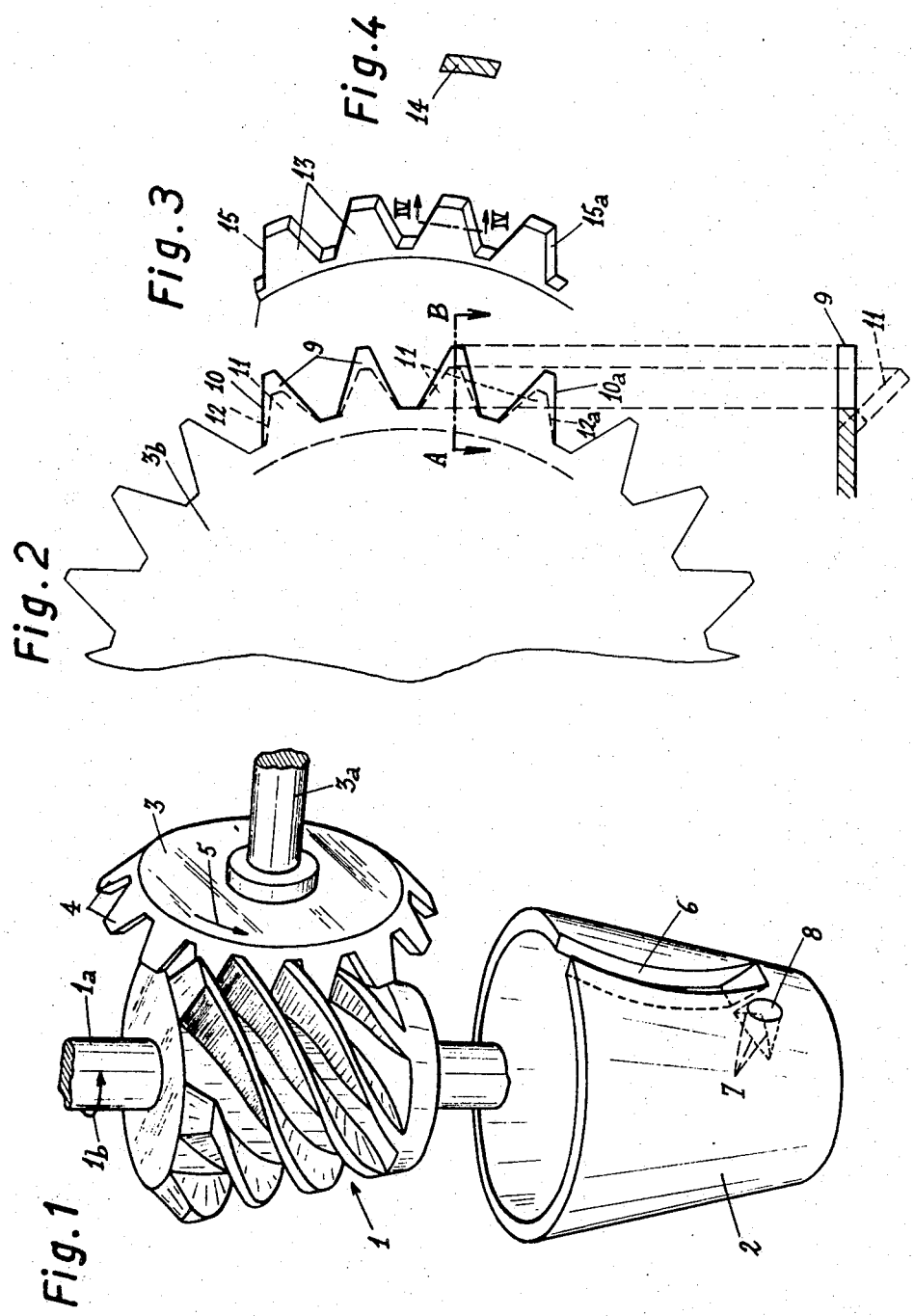

INVENTOR
BERNARD ZIMMERN
By Young & Thompson
ATTYS

Dec. 29, 1970  B. ZIMMERN  3,551,082
GLOBOID-WORM COMPRESSORS
Filed Jan. 27, 1969  8 Sheets-Sheet 5

INVENTOR
BERNARD ZIMMERN
BY Young & Thompson
ATTYS.

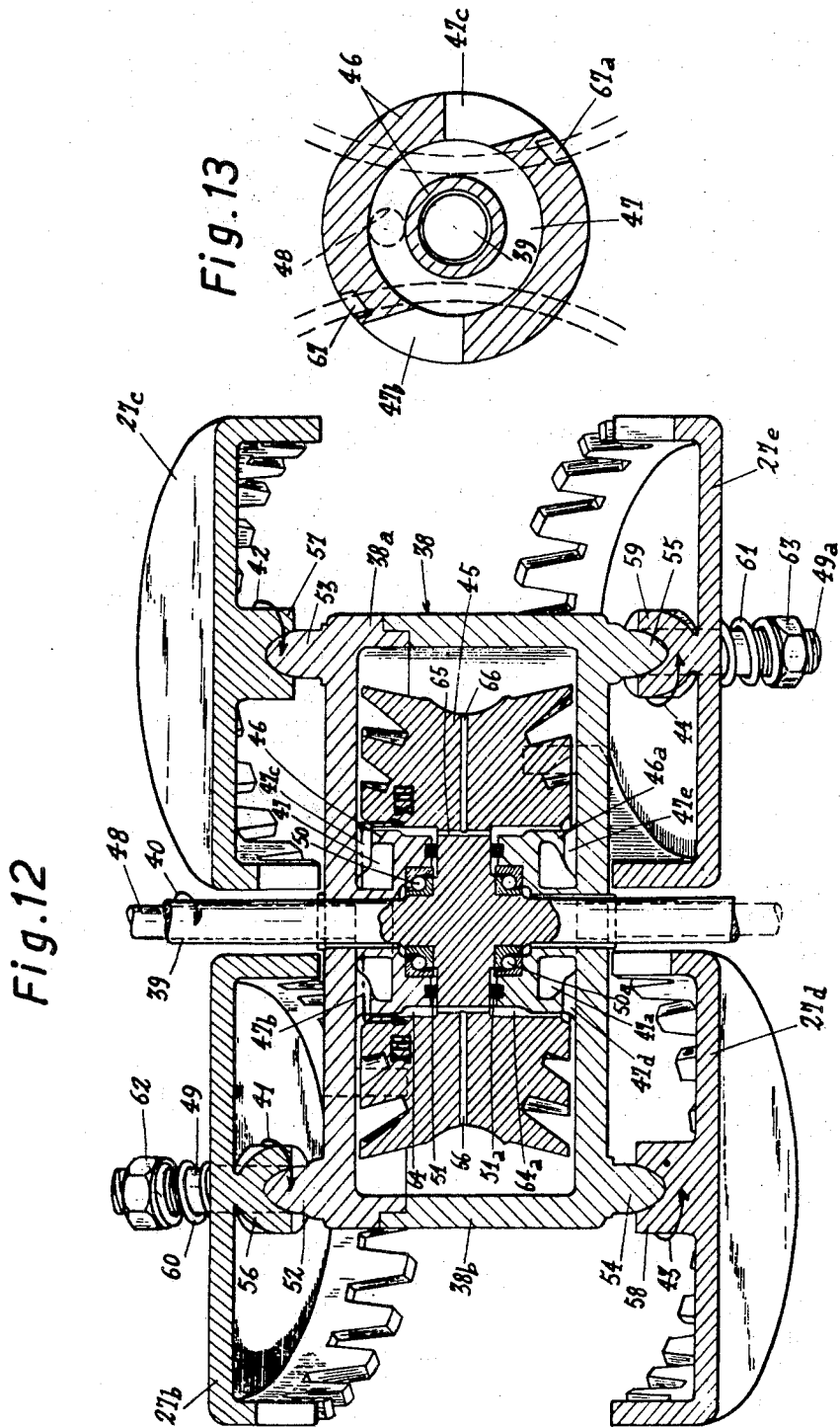

Dec. 29, 1970  B. ZIMMERN  3,551,082
GLOBOID-WORM COMPRESSORS
Filed Jan. 27, 1969  8 Sheets-Sheet 8

INVENTOR
BERNARD ZIMMERN
By Young + Thompson
ATTYS.

United States Patent Office 3,551,082
Patented Dec. 29, 1970

3,551,082
GLOBOID-WORM COMPRESSORS
Bernard Zimmern, 27 Rue Delabordere,
Neuilly-sur-Seine, France
Filed Jan. 27, 1969, Ser. No. 794,006
Claims priority, application France, Feb. 8, 1968,
139,172
Int. Cl. F01c 3/02, 3/06, 3/08
U.S. Cl. 418—195
18 Claims

ABSTRACT OF THE DISCLOSURE

A device is provided, such as a compressor, expansion machine, pump, hydraulic motor and the like, to vary the pressure of a fluid. Such device comprises a rotor having a toroidal surface and provided with a plurality of threads, a casing having symmetry of revolution about the axis of said rotor and adapted to cooperate with the crests of the threads of said rotor, and at least a pinion whose teeth come into mesh with said threads. According to the invention, the device is mainly characterized in that the teeth of said pinion are cut in a surface having symmetry of revolution about the rotation axis of said pinion and are inclined to said axis at an angle smaller than 90 degrees, in that milled slots are formed in said casing to enable said teeth to pass through the latter and to engage with said rotor and in that ports for admission and discharge of said fluid are provided on each side of said rotor, the ports for passage of the fluid on the high pressure side being located in the immediate vicinity of said pinion.

---

In order to form compression or expansion chambers of the variable volume type, it is known to make use of combinations comprising a rotor having a toroidal surface and projecting threads having a generally helicoidal shape which may or may not be truncated. The crests of said threads are intended to cooperate with a casing which closes said compression or expansion chambers and the rotor is adapted to cooperate with one or a number of pinions of flat shape, the teeth of which are in meshing relation with the threads formed on the rotor.

By "toroidal surface" is meant a surface which has symmetry of revolution about an axis and the meridian line of which is a circular arc whose plane contains but does not intersect said axis.

In the following specification, the rotor which is described above will be referred-to as a "globoid worm."

The space formed between two adjacent threads of a globoid worm of this type can accordingly form a chamber which is sealed off at one end by a tooth of one of the aforesaid flat pinions and sealed off at the other end by means of a stationary portion in which at least one discharge opening is formed preferably in the immediate vicinity of the flat pinion which cooperates with the aforesaid chamber.

When a fluid such as air or gas which can be at atmospheric pressure has been sucked from a chamber of this type, the rotation of said globoid worm permits of a progressive reduction in volume of the chamber; thus, said fluid is continuously displaced in the case of an incompressible fluid or compressed in the case of a gas until said chamber is put into communication with an outlet formed either in the above-mentioned casing or in a stationary support plate, said plate being provided at that extremity of the globoid worm which is located at the end remote from the fluid intake.

In the majority of known designs, one or a number of flat pinions are employed, the respective axes of rotation of said pinions being located at right angles to the axis of rotation of said globoid worm and the planes of said pinions being intended to pass substantially through said axis of rotation.

In other designs, the plane of the pinions is slightly offset or even inclined with respect to the axis of said globoid worm.

In the present state of the art, the number of threads formed on the globoid worm cannot usually be increased at will. Especially when it is desired to employ single-unit components, the pinions can engage with the globoid worm only if the base of each thread, that is to say the portion of thread which is located nearest the axis of said globoid worm, is relatively large whilst the threads have fairly sharp crests. In consequence, only a very small free space is provided between the threads and this results in an excessive reduction in the maximum volume of compressed gas which can be generated by a compressor of this type.

The aim of the present invention is to overcome the disadvantage which has just been mentioned.

According to the invention, the device for varying the pressure of a fluid such as a compressor, pressure regulator, pump, hydraulic motor and the like comprises a rotor having a toroidal surface provided with a plurality of projecting threads whose crests are adapted to cooperate with a casing having symmetry of revolution with respect to the axis of said rotor and adapted to come into mesh with the teeth of at least one pinion. Said device is essentially distinguished by the fact that the teeth of said pinion are cut in a surface having symmetry of revolution with respect to the axis of rotation of said pinion and are inclined to said axis at an angle which is smaller than 90 degrees and that milled slots are formed in said casing so as to permit said teeth to pass through this latter and to engage with said rotor and that ports for the admission and discharge of fluid are provided on each side of said rotor, the ports for the passage of fluid on the high-pressure side being located in the immediate vicinity of the aforesaid pinion.

It will be seen later that the arrangement outlined above permits the pinion to penetrate into the worm while providing in respect of a same number of threads which are capable of engaging simultaneously with a pinion of this type a useful space between said threads which is correspondingly greater as the angle of inclination of the teeth of the pinion to its axis of rotation is smaller.

In the extreme case of a pinion of cylindrical shape, the problem of interengagement no longer exists and it is even possible to provide the threads with any shape based solely, for example, on their resistance to the pressure exerted by the compressed gas.

According to a preferred embodiment of the invention, the teeth of the pinion are cut in a cylinder which is coaxial with the rotational axis of the pinion and said axis is inclined with respect to the axis of rotation of the rotor.

In a particular embodiment of the invention which is adapted in particular to the delivery of an incompressible fluid, the port through which the fluid passes on the high-pressure side provides simultaneous communication with all the chambers which are completely sealed off by one tooth of the pinion.

The object thereby achieved is to prevent the production of dangerous overpressures, especially in the case of incompressible liquids.

Further advantages of the present invention will be more readily understood from the following description of different forms of construction of globoid-worm machines which emply pinions of generally conical or cylindrical shape in accordance with the invention, said forms of construction being given by way of nonlimitative example and described with reference to the accompanying drawings, in which:

FIG. 1 is an exploded view in perspective showing a first embodiment of the invention comprising a globoid worm having truncated threads forming a conical profile and a pinion having teeth which are cut in a peripheral conical portion;

FIG. 2 is a diagrammatic view of a pinion with conical teeth;

FIG. 3 is a diagrammatic view showing the type of tooth having a maximum useful surface which can be employed in a pinion having conical teeth;

FIG. 4 is a cross-section along line IV—IV of FIG. 3;

FIG. 12 is a sectional view of a flat double compressor in accordance with the invention, wherein two symmetrical globoid worms are coupled together and adapted to cooperate with four pinions having cylindrical sets of teeth and mounted on the casing which cooperates with the thread crests of said globoid worms;

FIG. 13 is a part-sectional view taken along line XIII—XIII of FIG. 12;

Figure 5:
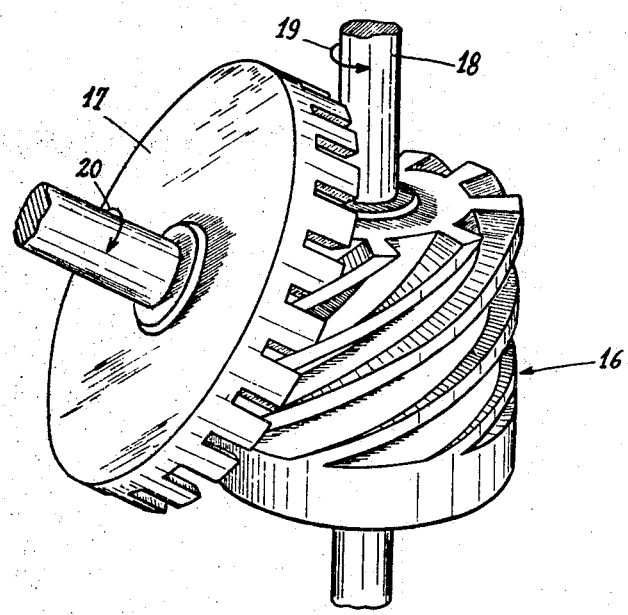
FIG. 5 is a view in perspective showing a second embodiment of the invention comprising a pinion having cylindrical teeth and a globoid worm having a generally cylindrical external shape in which the compression of gas takes place on the internal side of the pinion teeth.

There is shown in FIG. 1 a rotor 1 which will be generally referred-to hereinafter as a "globoid worm" and which has a toroidal surface, the meaning of this term being as defined earlier. Said rotor is provided with projecting truncated helical threads forming a conical external profile and adapted to cooperate with a conical casing 2 and with a bevel pinion 3 having teeth 4, a number of said teeth being adapted to cooperate with the different threads of the worm 1.

It is also apparent that the shaft 3a of the pinion 3 is substantially perpendicular to the axis of the worm but is offset so as to pass behind the rotor shaft 1a which is driven in rotation in the direction of the arrow 1b. Thus, the teeth of the pinion 3 which come into mesh simultaneously with the threads of the worm 1 and which pass through a milled slot 6 formed in the casing 2 drive the pinion 3 in rotation in the direction of the arrow 5 and the outer faces of the pinion teeth compress the gas which is present within the corresponding compression chambers.

The compressed gas passes through the casing 2 and flows out at the level of a triangular aperture formed in the internal wall of said casing. Said aperture corresponds to three sides 7 which are shown in FIG. 1 and is located in the immediate vicinity of the millet slot 6.

The cross-section of said aperture is tranformed through the wall of said casing so as to terminate in a substantially circular outlet cross-section as shown at 8 in FIG. 1.

The flanks of the pinion teeth are relieved as shown in FIG. 4 in such a manner as to ensure that the line of contact between said teeth and the worm is located in the immediate vicinity of the tooth face which is subjected to the pressure, that is to say the outer face of the teeth 4 in the case of FIG. 1.

Similarly, provision is made for a minimum clearance between that portion of the casing which is located on the left-hand side of the milled slot 6 of FIG. 1 and said outer face of the teeth 4 of the pinion 3; the clearance which is provided on the other side of the milled slot has no incidence.

There is shown in full lines in FIG. 2 a pinion 3b having teeth 9 which are assumed to be located in the same plane as said pinion.

In this example, the central teeth can penetrate simultaneously into the spaces formed between the threads of a globoid worm having a vertical axis inasmuch as the flanks 10 and 10a which correspond respectively to the top portion of the uppermost tooth and to the bottom portion of the lowermost tooth are parallel.

Assuming now that said pinion 3b is provided with teeth 11 having the same dimensions as the teeth 10 but disposed so as to conform to a conical profile of the type shown in FIG. 1 as represented in cross-section along the line AB in the lower portion of FIG. 2, the projection of said teeth onto the plane of the central portion of the pinion 3b corresponds to the teeth 11 which are shown in dashed lines in FIG. 2.

The projection of the top flank of the uppermost tooth and of the bottom flank of the lowermost tooth of the set of teeth 11 corresponds to two straight lines 12 and 12a which converge towards the exterior of the pinion instead of being parallel.

In order to be able to cause the pinion teeth to come into mesh simultaneously with the threads of a vertical globoid worm, the convergence mentioned above is not necessary and it is therefore possible to endow said teeth with profiles having a lesser degree of sharpness such as the profiles of the teeth 13 shown in FIG. 3.

In the case of this tooth profile as shown in transverse cross-section at 14 in FIG. 4, the top flank 15 of the uppermost tooth and the bottom flank 15a of the lowermost tooth 13 are both parallel. This permits the simultaneous penetration of the teeth 13 into the spaces formed between the threads of a vertical globoid worm while endowing said teeth with a larger cross-sectional area thereby increasing the output of the apparatus.

It should be pointed out that, when the set of pinion teeth finally becomes cylindrical, said teeth are oriented with respect to the globoid worm in a direction parallel to the axis of said cylindrical set of teeth.

In this case, the teeth may have any trapezoidal shape and may even be rectangular.

Figure 6:
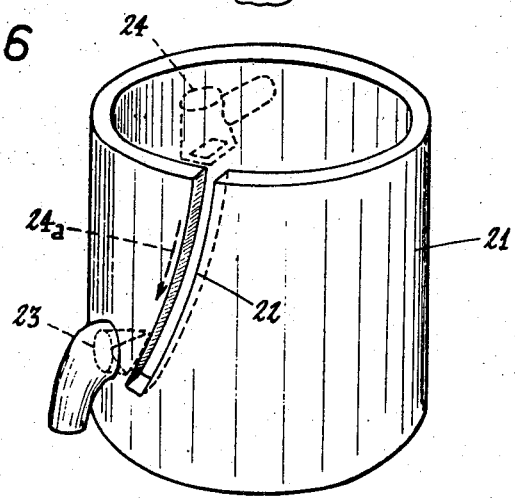
FIG. 6 is a view of the cut casing which is adapted to cooperate with the globoid worm of FIG. 5.

FIGS. 5 and 6 relate to a device which calls for the use of a globoid worm 16 having truncated threads which conform to a cylindrical external profile and a pinion 17 having a cylindrical set of teeth. In this device, the directions of rotation of the shaft 18 of the rotor 16 and of the pinion 17 correspond respectively to the arrows 19 and 20.

The cylindrical casing 21 which is adapted to cooperate with the rotor 16 is provided with a milled slot 22 through which the teeth of the pinion 17 are intended to pass and with an opening for the evacuation of the compressed fluid, said opening being provided externally with a substantially circular shape as shown at 23 in dashed lines in FIG. 6.

It can readily be understood that, in the arrangement shown in FIG. 5, the internal face of the set of teeth of the pinion 17 is subjected to the pressure of the compressed gas.

It will be seen below that the use of a cylindrical tooth worm of this type usually makes it possible both to prevent any axial thrust on the antifriction bearings or bearing-bushes which carry the shaft of the globoid worm and to simplify the machining of a worm of this type.

A nozzle which serves to inject a liquid into the interior of the pinion 17 so as to ensure both cooling and leak-tightness of the compressor is shown at 24 in FIG. 6.

As is apparent from this figure, the liquid jet is discharged in the direction of the arrow 24a so as to have the effect of sweeping the interior of the different teeth in the vicinity of the milled slot 22 of the casing 21. Said jet, not shown in the figure, has a width which is equal to the height of said teeth.

The velocity of said jet as it issues from the nozzle is chosen so as to be substantially equal to the velocity of rotation of the teeth; and the liquid which has a tendency to propagate in a straight line is accordingly applied against the interior of the teeth of the cylindrical pinion and remains applied under the action of centrifugal force during the rotation of said pinion.

Figure 7:
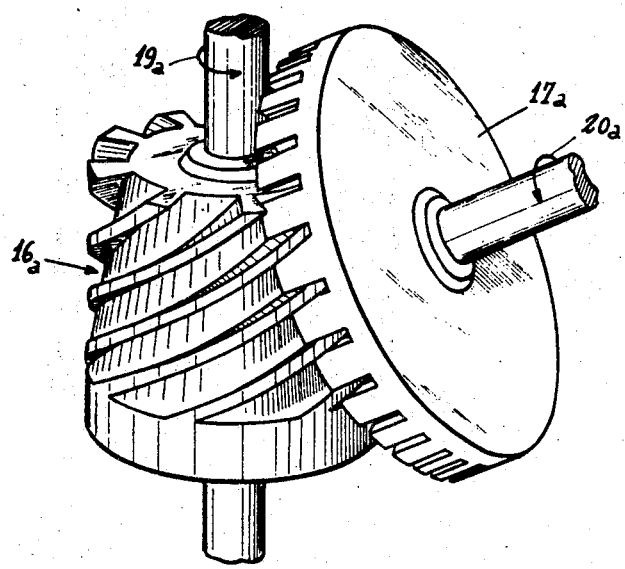
FIG. 7 is a view which is comparable with FIG. 5 but relates to the case in which the compression takes place on the external side of the teeth.
Figure 8:
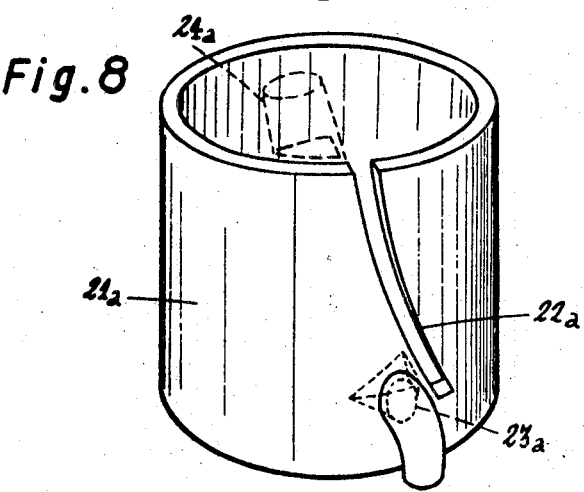
FIG. 8 is a view of the cut casing which is adapted to cooperate with the globoid worm of FIG. 7.

Referring now to FIGS. 7 and 8, it is apparent that the cylindrical globoid worm 16a is in meshing relation with a pinion 17a. The outer face of the set of pinion teeth is intended to withstand the pressure of the compressed gas.

The respective directions of rotation of the globoid worm and of the pinion shaft are shown at 19a and 20a in FIG. 7.

There is formed in the casing 21a a milled slot 22a which performs the same function as the slot 22 and the discharge of compressed gas takes place through an opening having a substantially circular cross-section 23a on the outer face of the casing 21a as shown in FIG. 8.

The nozzle for the injection of liquid which is intended to ensure leak-tightness between the external portion of the teeth of the pinion 17a and the threads of the worm 16a is shown at 24a in FIG. 8.

In this case, the injection is carried out in the vicinity of said external portion of the teeth of the pinion 17a and the injectors of triangular cross-section have convergent walls and so oriented that all the points of the set of teeth of said pinion which are simultaneously in contact with the worm can be reached by the different streams of liquid which are projected by said injectors and which are propagated in a straight line.

It should be pointed out that, in both cases of FIGS. 5 and 7, the plane of the pinions is not parallel to the axis of the worm and is inclined, thereby tending to reduce the height of the threads on the high-pressure side and thus to increase the compression or expansion ratio.

It will also be noted that the plane which is tangent to the pinion cylinder in the zone which cooperates with the worm is substantially parallel to the axis of the worm so that the pressure which is exerted on the teeth of the pinions generates a force which is substantially perpendicular to said axis and therefore does not produce any reaction on the worm in a direction parallel to said axis.

The above-described arrangement presents the antifriction bearings from being subjected to an axial thrust of appreciable magnitude.

However, if it is also desired to prevent the application of any radial force on the worm, it is advantageous to bring said worm into mesh with two identical pinions which are placed symmetrically with respect to the axis of rotation of this latter.

Figure 9:
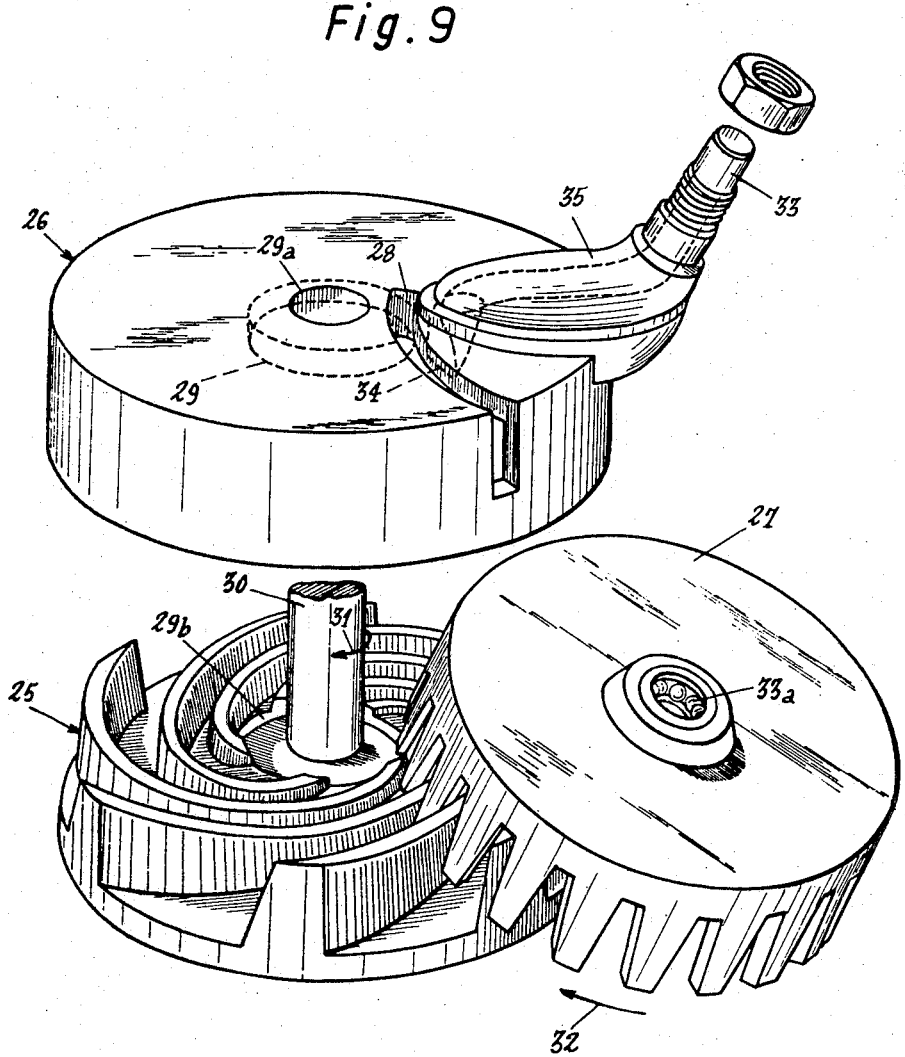
FIG. 9 is an exploded view in perspective showing a third embodiment of the invention comprising a globoid worm which is adapted to cooperate with a casing of substantially flat shape and with a cylindrical-tooth pinion; in this form of construction, the compression is carried out within the interior of the pinion.
Figure 10:
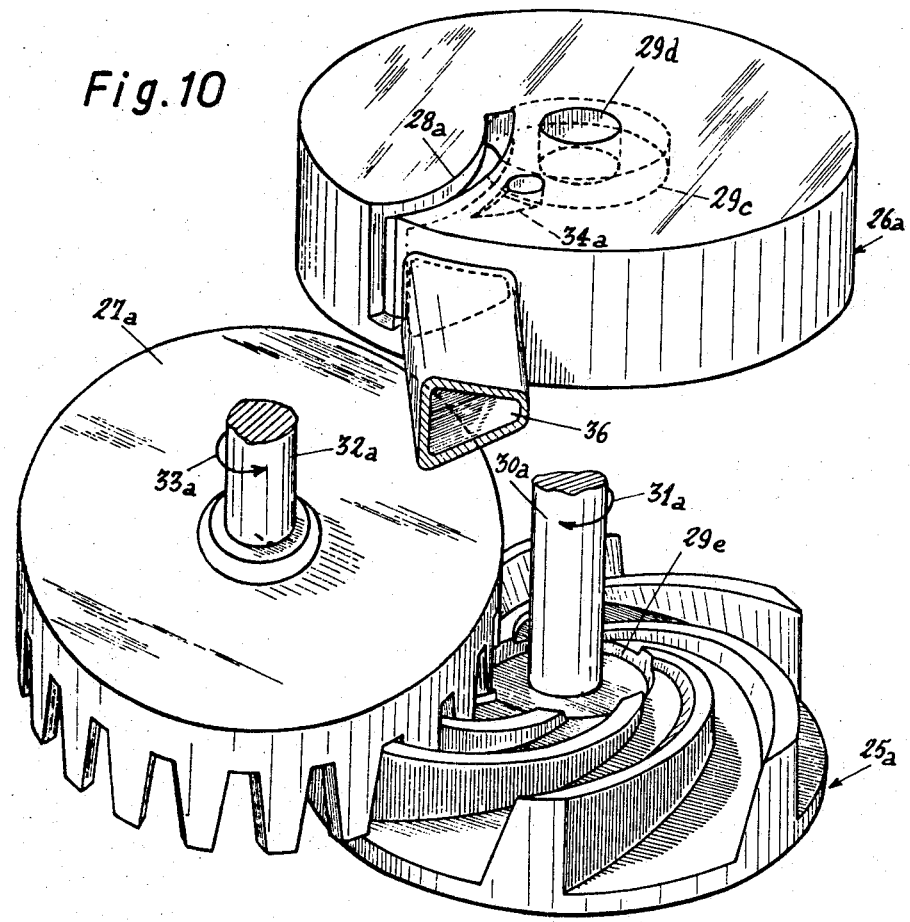
FIG. 10 is an exploded view in perspective showing a compressor which is comparable with that of FIG. 9 but in which the compression is carried out externally of the pinion.

FIGS. 9 and 10 relate to flat compressors which are also fitted with cylindrical-tooth pinions and with worms having truncated-thread crests which are adapted to cooperate with a flat casing.

Apart from the simplicity of machining which is permitted by this arrangement, the fluid can be sucked in at the periphery and discharged at the center after compression. This arrangement secures the advantage of a reduction in diameter while improving the compression ratio.

A flat compressor of this type has a shape such that the height of the threads decreases progressively from the exterior towards the interior and compression ratios substantially in excess of 10:1 can easily be obtained by means of worms having six threads and pinions having approximately thirty teeth, for example either twenty-nine or thirty-one teeth, since the numbers of threads and teeth should preferably be incommensurable with each other.

The threads of the worm 25 of FIG. 9 are adapted to cooperate in this form of construction with the internal portion of a casing 26 which has a flat shape at the top and surrounds the external cylindrical portion of the worm 25 while leaving a suction space at the periphery of the worm. The cylindrical-tooth pinion 27 also cooperates with the threads of the worm 25 and the teeth which come into mesh simultaneously with said threads pass through a milled slot 28 which is formed in the casing 26; said slot is cut through an internal circular rib 29 which surrounds a central recess 29a providing a passageway for the rotor shaft 30, the outer portion of said rib being adapted to fit within a cylindrical recess 29b which is formed at the center of the worm 25 at the top portion of this latter.

During operation, said rotor shaft rotates in the direction of the arrow 31 whilst the pinion 27 rotates in the direction of the arrow 32 about a hollow shaft 33 by means of ball-bearings 33a, compression being produced by the internal tooth faces of the pinion 27.

From FIG. 10, it is apparent that the reference numerals 25a to 28a, 29c, 29d, 29e, 30a to 33a have been employed to designate elements which are similar to those designated by the reference numerals 25 to 33 of FIG. 9 but, in this case, compression is produced by the outer tooth faces of the pinion 27a.

It is to be noted that the axis of rotation of the pinions 27 and 27a is inclined with respect to the axis of rotation of the worms 25 and 25a in order that on the one hand the set of teeth cannot intersect twice with a single thread and that on the other hand the height of the threads should decrease from the exterior towards the interior in both cases so as to increase the compression ratio.

It is clear that, as in the other embodiments illustrated in FIGS. 1, 5 and 7, the profile of the globoid worm at the thread base is a toroidal surface and the meridian line of said surface is a circular arc which corresponds in different cases either to the internal portion or to the external portion of the tips of a number of pinion teeth which are intended to engage simultaneously with said globoid worm; and the plane of said circular arc never passes through the axis of said globoid worm.

In the case of FIG. 9, steps are preferably taken to ensure that the compressed fluid is discharged through the interior of the pinion shaft, so that provision need not be made for a compressed-fluid discharge duct having an unnecessarily complicated shape.

To this end, an aperture 34 is formed in the flat casing which cooperates with the globoid worm 25. Said aperture is placed in the vicinity of the milled slot 28 which provides a passageway for the pinion 27 and communicates with the top face of the casing. An internally hollowed-out member 35 is intended to be fixed externally on the outlet of the aperture 34 and is provided with ball-bearings which are intended to support the pinion 27.

The foregoing arrangement is called-for only when the apparatus is fitted with a liquid injection nozzle of the type illustrated in FIG. 6 in order that the compressed fluid should be cooled to a sufficient extent and in order to prevent any possibility of abnormal heating of said hollow member 35 and of subsequent jamming of the ball-bearings of said pinion 27.

In the case of FIG. 10 in which the compressed fluid is discharged externally of the pinion at 34a, said discharge does not entail the need for any special precaution inasmuch as the injection of liquid is also carried out externally of the pinion through a duct shown at 36 in FIG. 10.

Figure 11:
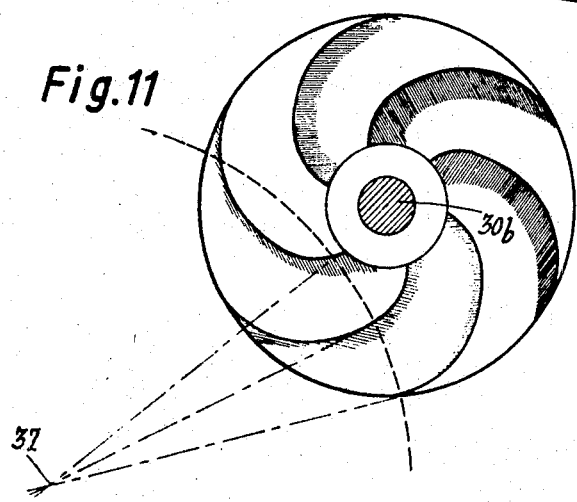
FIG. 11 is a diagrammatic view showing the position to be occupied by the center of a cylindrical-tooth pinion which is adapted to cooperate with a globoid worm of the type shown in FIGS. 9 and 10 so that the angle of slope of the flanks of said pinion should vary only to a slight extent during the travel of this latter within said worm.

The central portion of the thread crests of a globoid worm is illustrated in plan in FIG. 11. From this figure, it is seen that the radius of curvature of said threads decreases progressively towards the shaft of the globoid worm to which is assigned the reference numeral 30b. Moreover, the different angles of inclination of the different threads as considered at vertices located on a circular arc correspond to straight lines which meet substantially in the vicinity of a point 37.

Assuming that a pinion is centered substantially at 37, the different teeth of said pinion will be located substantially at right angles to the threads of the globoid worm at the points at which said teeth are intended to mesh with said threads.

As will be readily understood, the foregoing is only an approximation. However, steps may be taken in practice to ensure that the angles made with the teeth of the pinion by the different threads of the globoid worm vary only slightly during the rotation of these two components.

It should additionally be pointed out that the angles of inclination do not vary to any appreciable extent along the flanks of the pinion teeth, this property being inherent in the use of cylindrical-tooth pinions.

This property dispenses with the need to cut the flanks of the teeth according to a helical profile and makes it possible to provide said flanks with a flat profile which can be obtained by milling.

The type of compressor which is illustrated in FIGS. 9 and 10 therefore provides the following advantages:

The use of teeth having flanks which are only slightly undercut and therefore have a high degree of rigidity and strength;

Increased zone of contact between the pinion teeth and the worm threads on the flanks of the pinion teeth, thereby enhancing leak-tightness;

Finally, greater ease of machining resulting from the small variation in the angle of inclination of the threads as considered along said threads in a direction parallel to the axis of the globoid worm.

By way of example, a compressor having a worm with six threads which is equal in external diameter to twice the internal diameter of the threaded portion and which is in meshing relation with a pinion having 35 teeth, the center of which is located substantially at the same distance from the axis of the worm as the interior of said threaded portion whilst the diameter of said pinion is of the order of 1.9 times that of the interior of the threaded portion, exhibits a small variation in the angle made with the plane which is tangent to the flank of each thread by the radius which joins the center of the pinion to the flank of each tooth which meshes with said thread.

If said angle is 30°, for example, at the moment at which the tooth penetrates into the outer portion of the worm, said angle will still be 15° at the moment when the same tooth recedes from the point of contact with the threads of the globoid worm.

In globoid worm compressors of known types, the corresponding variations are much greater. Thus, the variations in inclination of the threaded flanks attain a value of the order of 30° in respect of maximum inclinations which can attain 45°.

There is shown in FIG. 12 a more detailed construction of a double compressor corresponding to the combination of a two-pinion compressor of the type shown in FIG. 9 with a two-pinion compressor of the type shown in FIG. 10, the two globoid worms of the two combined compressors being coupled together and driven in rotation by the same shaft.

It is apparent that the double compressor of FIG. 12 comprises two upper pinions 27b and 27c which compress the fluid by means of the internal faces of the pinion teeth and two lower pinions 27d and 27e which compress the fluid by means of their external tooth-faces.

The two pinions 27b and 27d are parallel and are inclined respectively with respect to the top face and to the bottom face of the casing 38.

Said casing is constucted in two interfitting sections which are designated respectively by the reference numerals 38a and 38b.

The rotor shaft 39 is driven in rotation in the direction of the arrow 40, thereby driving the two pinions 27b and 27c in the direction of the arrows 41 and 42 whilst this rotational motion in turn causes the lower pinions 27d and 27e to rotate in the opposite direction as shown by the arrows 43 and 44.

The globoid worm 45 is double as has been indicated earlier and although the threaded portion of said worm is of smaller height towards the center of the threads than at the periphery of said threads which occupy two annular spaces on the globoid worm, said height is not zero.

It is for the above reason that the casings 38a and 38b are provided in the vicinity of the rotor shaft 39 with additional cylindrical portions 46 and 46a which serve to close off the different compression chambers near the internal portion of the globoid worm. However, the compressed gas is permitted to escape from each chamber and to reach recessed annular portions 47 and 47a which are formed inside the cylinders 46 and 46a at the moment when said chambers are put into communication at the end of the compression process with discharge outlets which are formed through the walls of said cylinders as shown at 47b and 47c in FIG. 12.

Said recessed annular portions are in turn connected to vertical pipes for the evacuation of compressed gas. One vertical pipe is shown in dashed lines at 48 in FIG. 12 and passes behind the rotor shaft 39 whilst the other vertical pipe which is not visible in FIGS. 12 and 13 passes in front of the lower portion of the rotor shaft 39.

It can readily be understood that, when the height of the threads in the inner portion of the globoid worm becomes zero, the cylinders 46 and 46a can be dispensed with. In that case, the compressed gas can be discharged either through the pinion shafts such as the shaft 49 of the upper pinion 27b which is visible in FIG. 12 and the shaft of the pinion 27c which is not visible and located in front of the sectional plane of FIG. 12 in the case of pinions which compress the gas by means of the internal tooth faces, or through triangular apertures formed in the casing externally of the pinions 27d and 27e in the vicinity of the milled slots through which the pinion teeth are intended to pass.

The opposite extremities of the cylinders 46 and 46a are provided with axial ball-bearings 50 and 50a which are adapted to center or position the globoid worm and which are protected by flat seals 51 and 51a.

The casing 38 is milled to form a passageway for the pinions as stated earlier and is provided with pivot-pins 52, 53, 54 and 55 on which said pinions are rotatably mounted by means of bearing-sockets 56, 57, 58 and 59.

The four pinions 27b to 27e are capable of rotating respectively on the pivot-pins 52 to 55 and are applied against the globoid worm by means of springs shown at 60 and 61 in the case of the two pinions 27b and 27e, the tension of said springs being adjustable by means of nuts 62 and 63.

It should be pointed out that the cylinders 46 and 46a are provided with shouldered portions forming two annular chambers 64 and 64a which permit expansion of fluid which passes as leakage between the cylinders 46 and 46a and the worm, said fluid leakage being returned to the suction end of the compressor by means of ducts 65 which serve to connect the two annular chambers 64 and 64a and which are formed in the globoid worm parallel to the rotor shaft 39. A communication is established between said ducts and the suction end of the apparatus by means of radial bores 66 which are located in the central plane of the globoid worm.

Said ducts and bores prevent any accumulation of compressed gas within the chambers 64 and 64a which would otherwise be liable to cause unseating of the flat seals and could prove detrimental to the satisfactory performance of the ball-bearings 50 and 50a.

In the sectional view of FIG. 13, there are shown the internal and external portions of the cylinder 46 as well as the recessed annular portion 47 and the rotor shaft 39.

There are also shown in FIG. 13 the ports 47b and 47c which permit the compressed gas to pass into the annular recess 47 and the discharge pipe 48, the lower end of which communicates with said annular space 47.

Finally, FIG. 13 shows the extremities 67 and 67a of two milled slots through the upper pinions 27b and 27c are intended to pass.

Apart from the foregoing considerations of interengagement, compressors which are fitted with pinions of either conical or even cylindrical shape provide different complementary advantages.

In the first place, the known methods hitherto adopted for the purpose of cutting a globoid worm entailed the use of a special tool whose cutting profile matched the tooth form and which was displaced progressively either towards or away from the axis of rotation of said globoid worm in a fairly complex movement. In the method according to the invention, the cutting operation can be performed by imparting a much simpler movement to a set of tools which permit a large number of teeth to be machined simultaneously on the globoid worm, thereby considerably reducing the machining time in a proportion which can attain 9/10 of the time in the case of worms which are provided with six threads.

A further advantage of the novel solution herein proposed lies in the fact that the play which takes place between pinion and worm can be taken up simply by displacing the pinions; this was not possible in the case of known methods in which the position on the flat pinions was immutably defined by the design geometry of the gearing.

In the case of cylindrical pinions, it is only necessary to displace the pinions along their rotational axes by employing teeth of trapezoidal shape in order to take up any accidental play which might tend to develop even though it may be necessary to permit limited friction (without thereby affecting the operation of the device); said friction can be adjusted at will by reason of the fact that the compressed fluid exerts a thrust on the pinions only at right angles to the teeth, namely at right angles to the axis of rotation in the case of cylindrical pinions, and that said compressed fluid therefore does not exert a thrust which would prevent such an adjustment from being made.

Finally a further advantage of the new methods proposed is that, in the case of globoid worm compressors in accordance with the invention which are provided with casings of flat or substantially flat shape in meshing relation with crests of threads which are formed on a suitable portion of the globoid worm, it is found that the relative variations in angle of inclination of the threads with respect to the teeth are of a small order. This makes it possible to utilize teeth having flanks which are only slightly undercut and which consequently have higher mechanical strength in spite of simpler machining and also better fluid-tightness between the tooth flanks and those of the globoid worm threads by virtue of the shape of said casings.

Figure 14:
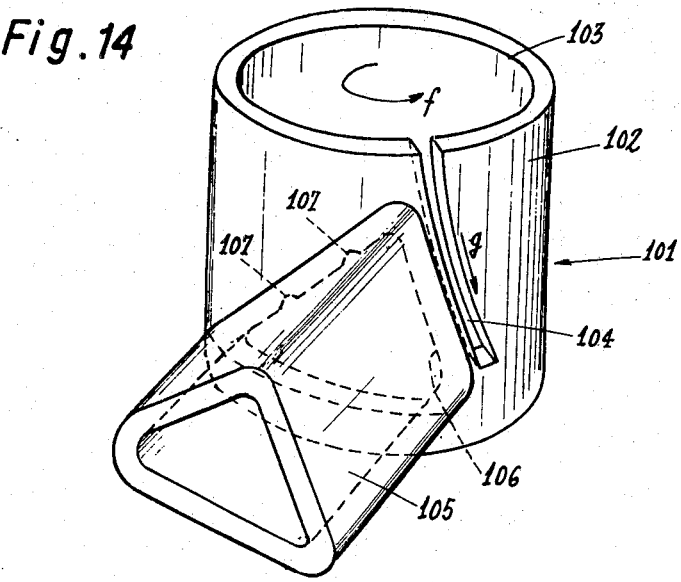
FIG. 14 is a view in perspective showing a casing which is intended to cooperate with the worm and the pinion of FIG. 7 in order to deliver an incompressible fluid.
Figure 15:
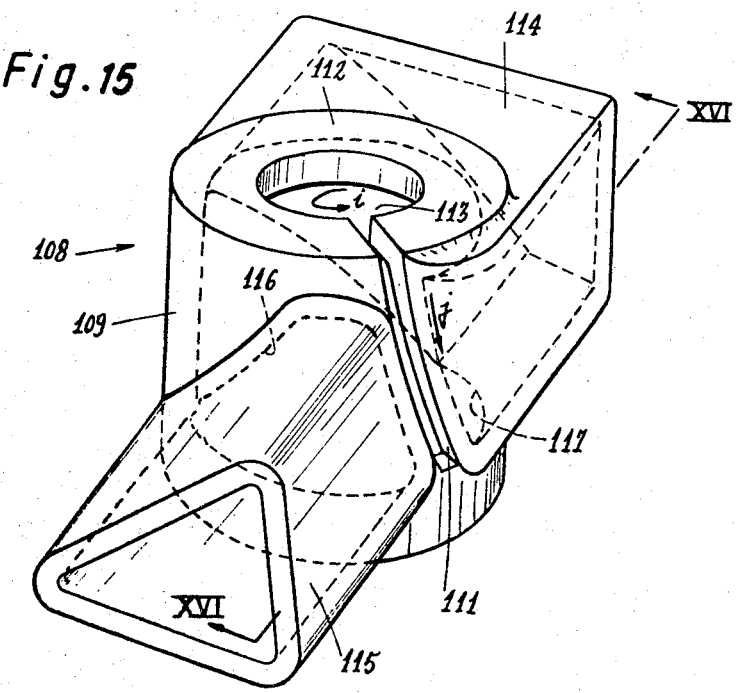
FIG. 15 is a view in perspective showing another construction of a casing which is intended to cooperate with the worm and the pinion of FIG. 7 in order to deliver an imcompressible fluid.
Figure 16:
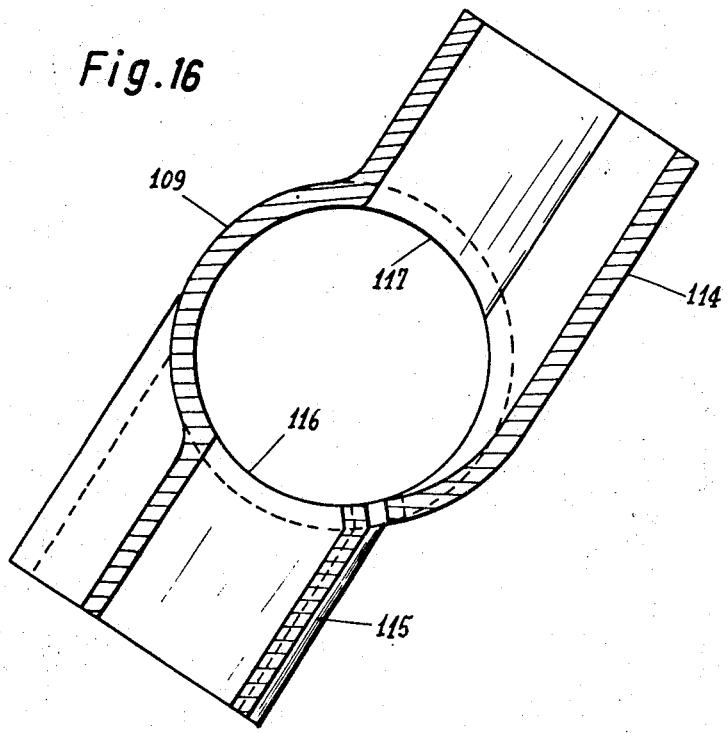
FIG. 16 is a sectional view taken along line XVI—XVI of FIG. 15.

There have been shown in FIGS. 14 to 16 two forms of construction of a casing which is designed to cooperate with a cylindrical globoid worm 16a and a pinion 17a of the cylindrical-tooth type shown in FIG. 7.

The casing 101 of FIG. 14 comprises a cylindrical vessel 102 which is open at the top end 103, there being formed in the lateral surface of said vessel a milled slot 104 through which the pinion teeth are permitted to pass.

A discharge tube 105 of substantially triangular cross-section is fixed on the exterior of the vessel 102 in the vicinity of the milled slot 104. Said tube 105 has its opening in the vessel 102 in the form of an outlet 106 through which the fluid on the high-pressure side is intended to flow. Said outlet also has a substantially triangular cross-section and is provided with indentations 107 on the side remote from the slot 104.

The size of the opening 106 which is parallel to the axis of the vessel 102 is slightly smaller than the height of said vessel. More precisely, the size of the opening is such that, when the worm 16a and the pinion 17a are in position, all the chambers which are defined by adjacent threads of the worm 16a and completely sealed off by one tooth of the pinion 17a are in communication with the opening 106. It must be noted that the end chamber which is located on the low-pressure side, that is to say on the side corresponding to the opening 103, does not communicate with said opening as long as it is only partially closed by one tooth of the pinion. On the other hand, said chamber is put into communication with the opening 106 as soon as it is completely sealed off by one tooth.

During operation, the worm rotates in the direction of the arrow $f$ and the pinion is driven in the direction of the arrow $g$. The fluid is aspirated around the entire periphery of the worm at the end corresponding to the opening 103 of the vessel 102 and fills the chambers which are defined by adjacent worm threads. When said chambers are sealed off by one tooth of the pinion, they are put into communication with the tube 105 by means of the opening 106. Thus, even if the fluid is incompressible, there does not occur any dangerous overpressure within the chambers, the discharge pressure being equal to the value which is necessary for the delivery of fluid.

As has been stated in the foregoing, the axial height of the opening 106 is chosen so that the end chamber which is located on the low-pressure side does not communicate with said opening as long as it is not partially closed by a tooth of the pinion. In consequence, there can be no direct communication between the suction and discharge. Furthermore, no overpressure can develop within said chamber inasmuch as this latter is put into communication with the opening 106 as soon as it is sealed off by one tooth of the pinion.

The intended function of the indentations 107 is to ensure that, by reason of the machining tolerances, the last chamber which is located on the low-pressure side and sealed off by the pinion is effectively brought to the discharge pressure so as to prevent any danger of compression of the liquid which would destroy the apparatus. Any leakage which is liable to result from the presence of the indentations 107 in any case remains negligible.

Figure 17:
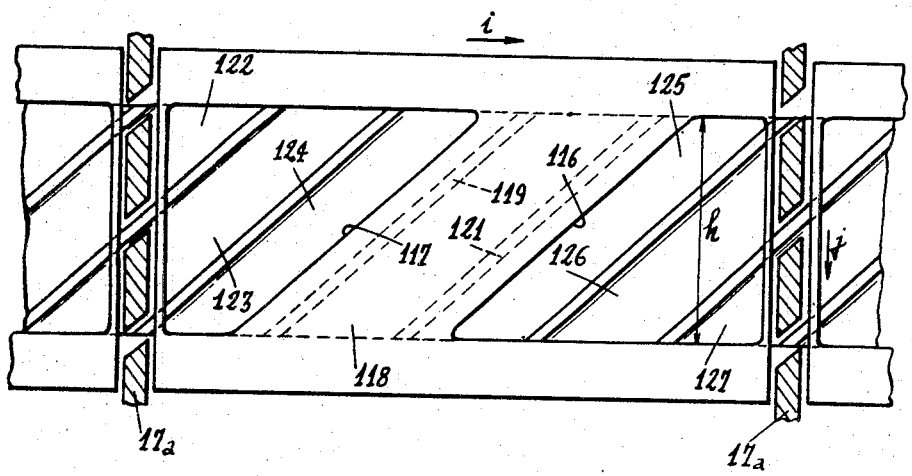
FIG. 17 is a developed diagrammatic view of a worm and a pinion which is adapted to cooperate with the casing of FIG. 15.

It is apparent that, in the construction of FIG. 14, the fluid is transferred through the machine in a generally axial direction. Referring to FIGS. 15 to 17, there will now be described another form of construction whereby the fluid is conveyed on the contrary in a general direction at right angles to the axis of the worm.

The casing 108 which is illustrated in FIGS. 15 and 16 is provided as in the previous embodiment with a cylindrical vessel 109 in which is formed a milled slot 111. The vessel 109 is provided at the top with a cover 112 in which is pierced a hole 113 providing a passage for the rotor shaft.

An admission tube 114 and discharge tube 115 are fixed on the external lateral surface of the vessel 109. The discharge tube 115 is of substantially triangular cross-section and located within a short distance of the milled slot 111 and upstream of this latter with respect to the direction of rotation of the worm. Said discharge tube has its opening in the vessel 109 in the form of an outlet 116 having a cross-sectional shape which is also substantially triangular. The admission tube 114 is of substantially trapezoidal cross-section and has its opening in the vessel 109 in the form of an inlet 117.

The height $h$ (FIG. 17) of the openings 116 and 117 as measured parallel to the axis of the worm is such that said openings are respectively in communication with all the chambers such as the chambers 122 to 124 on the one hand and the chambers 125 to 127 on the other hand which are defined by adjacent threads of the worm located on a same generator-line of the casing. The profile of said openings and the dimensions thereof in the successive planes at right angles to the rotor shaft are such that the zone of the casing which is located between said openings and cooperates with the worm in fluid-tight manner extends over a spatial interval 118 which is greater than the distance between two crests 119, 121 of consecutive threads, as shown in FIGS. 17.

During operation, when the worm and the pinion are in position, the worm rotates in the direction $i$ and the pinion rotates in the direction $j$. The chambers between successive threads are sealed off at the top by means of the cover 112. The fluid is admitted through the opening 117 and fills the chambers 122 to 124. Said chambers are then brought into the zone 118 in which they are prevented from communicating either with the intake or discharge by the fluid-tight zone of the casing. The chambers then take up positions such as the position 125 in which they communicate with the outlet opening 116, then positions such as 126 and 127 in which the teeth of the pinion force the fluid into the tube 115.

It is understood that, under these conditions, the chambers are put into communication with the discharge prior to being swept by one tooth of the pinion, thereby eliminating any danger of overpressure.

On the other hand, in order to prevent any danger of direct communication between the intake and discharge, it is necessary and in fact sufficient to ensure that the fluid-tight zone of the casing which is located between the openings 116 and 117 is greater than the distance between two crests 119 and 121 of consecutive threads. The manufacturing tolerances allowed on the dimensions of said openings can be of any desired magnitude.

In addition to the advantages of the preceding embodiments, the embodiments of FIGS. 14 to 16 permit the use of globoid worm and pinion machines for the delivery of incompressible liquids. It has been seen that this is obtained by means of simple design solutions which do not call for close machining tolerances.

These design solutions can also be applied to hydraulic motors, in which case the machine operates in the opposite direction.

As will be readily understood, the invention is not limited to the embodiments hereinabove described and a large number of alternative forms of construction may be contemplated without thereby departing from the scope of this invention. In particular, the embodiments of FIGS. 14 to 16 are applicable to all pairs of worms and pinions which have been described in the foregoing.

What I claim is:

1. A device for varying the pressure of a fluid such as a compressor, pressure regulator, pump, hydraulic motor and the like and comprising a rotor having a toroidal surface provided with a plurality of projecting threads whose crests are adapted to cooperate with a casing having symmetry of revolution with respect to the axis of said rotor and to come into mesh with the teeth of at least one pinion, characterized in that the teeth of said pinion are cut in a surface having symmetry of revolution with respect to the axis of rotation of said pinion and are inclined to said axis at an angle which is smaller than 90 degrees, that milled slots are formed in said casing so as to permit said teeth to pass through this latter and to engage with said rotor and that ports for the admission and discharge of fluid are provided on each side of said rotor, the ports for the passage of fluid on the high-pressure side being located in the immediate vicinity of the aforesaid pinion.

2. A device in accordance with claim 1, characterized in that the teeth of the pinion are cut in a cylinder of revolution about the axis of rotation of said pinion.

3. A device in accordance with claim 2, characterized in that the teeth of the pinion are adapted to cooperate with a rotor in which the thread crests are limited by a cylindrical surface.

4. A device in accordance with claim 3, characterized in that the axis of rotation of the pinion is inclined with respect to the axis of rotation of the rotor in such a manner as to ensure that the pinion is located at a greater distance from the axis of the rotor on the side corresponding to the high-pressure openings than on the side corresponding to the low-pressure openings through which the fluid passes.

5. A device in accordance with claim 4, characterized in that the mean plane which is tangent to the cylindrical surface of the pinion teeth in the zone in which said teeth come into mesh with the threads of the rotor is substantially parallel to the axis of rotation of said rotor.

6. A device in accordance with claim 2 and in which the crests of the rotor threads are limited by a substantially plane surface and adapted to cooperate with a flat center, characterized in that the axis of rotation of the pinion is inclined with respect to the axis of rotation of the rotor so that the pinion is located at a greater distance from the rotor in the region which is adjacent to the axis of said rotor than in the peripheral region of said rotor.

7. A device in accordance with claim 6 and in which the rotor is provided with two threaded portions adapted to cooperate with flat symmetrical casings, characterized in that each threaded portion is adapted to engage with at least one pinion whose axis of rotation is inclined with respect to the plane of the corresponding casing.

8. A device in accordance with claim 7 and in which each of the threaded portions of the rotor is adapted to engage with two pinions each having a cylindrical set of teeth, characterized in that the axes of rotation of the pinions are symmetrical with respect to the rotor shaft and are inclined at equal angles with respect to a plane which passes through the rotor shaft.

9. A device in accordance with claim 8, characterized in that the pinions which cooperate with the opposite faces of the rotor are parallel in pairs, the pinion of each pair which cooperates with one face of the rotor being intended to displace the fluid by means of the internal side of its set of teeth whilst the other pinion of each pair which cooperates with the other face of the rotor is intended to displace the fluid by means of the external side of its set of teeth.

10. A device in accordance with claim 8, characterized in that the pinions which cooperate respectively with the two opposite faces of the rotor are mounted symmetrically with respect to the central plane of symmetry of the rotor and that the fluid is displaced by the same sides of the sets of teeth of all the pinions.

11. A device in accordance with claim 7, characterized in that the casings comprise cylindrical portions which are concentric with the rotor and penetrate respectively into the upper and lower portions of said rotor, said cylindrical portions being provided with ports through which the fluid on the high-pressure side is intended to pass.

12. A device in accordance with claim 6, characterized in that the casing is provided with ports through which the fluid on the high-pressure side is intended to pass.

13. A device in accordance with claim 12, characterized in that the ports formed in the casing are located on the inside of the pinion and communicate with a duct formed in the shaft of said pinion.

14. A device in accordance with claim 6, characterized in that the teeth of the pinion have a trapezoidal profile whose short side is located at the outer extremity of the teeth.

15. A device in accordance with claim 6, characterized in that it comprises elastic members for applying the pinions against the rotor in a direction parallel to the axis of rotation of said pinions.

16. A device in accordance with claim 1, characterized in that the opening for the passage of fluid on the low-pressure side is adapted to communicate at the same time with all the chambers which are defined by adjacent threads of the rotor and the opening for the passage of fluid on the high-pressure side is adapted to communicate with those chambers which are sealed off by the teeth of a same pinion.

17. A device in accordance with claim 1, characterized in that the openings for the passage of fluid on the low-pressure side and high-pressure side are each respectively in communication with all the chambers which are defined by adjacent worm threads and are located along a generator-line of the casing and that the zone of the casing which is adapted to cooperate with the rotor in fluid-tight manner and which is located between consecutive openings on the low-pressure side and high-pressure side extends over a spatial interval which is greater than the distance between two crests of consecutive threads.

18. A device in accordance with claim 1, characterized in that the radially inner face and radially outer face of each pinion tooth, with respect to the axis of rotation of the pinion, are each inclined to said axis at angles smaller than 90°.

References Cited

UNITED STATES PATENTS

| | | | |
|---|---|---|---|
| 265,381 | 10/1882 | Buck | 103—125 |
| 1,367,801 | 2/1921 | Clark | 103—125 |
| 1,654,048 | 12/1927 | Myers | 103—125 |
| 1,735,477 | 11/1929 | Stuart | 123—13(E) |
| 2,158,933 | 5/1939 | Good | 230—150 |
| 2,232,702 | 2/1941 | Holzknecht | 91—84 |
| 2,327,089 | 8/1943 | Bejeuhr | 91—84 |
| 3,133,695 | 5/1964 | Zimmern | 230—150 |
| 3,180,565 | 4/1965 | Zimmern | 230—150 |

CARLTON R. CROYLE, Primary Examiner

W. J. GOODLIN, Assistant Examiner